United States Patent [19]

Magnuson

[11] Patent Number: 4,715,774

[45] Date of Patent: Dec. 29, 1987

[54] WORKPIECE ADVANCING APPARATUS

[75] Inventor: James M. Magnuson, Kankakee, Ill.

[73] Assignee: Peddinghaus Corporation, Bradley, Ill.

[21] Appl. No.: 812,739

[22] Filed: Dec. 23, 1985

[51] Int. Cl.$^4$ ............................................. B65G 25/00
[52] U.S. Cl. .................. 414/751; 198/468.2; 271/268; 294/103.1
[58] Field of Search .................. 198/468.1, 468.2, 740, 198/748; 414/18, 19, 751, 753; 271/84, 268, 269; 294/103.1, 112

[56] References Cited

U.S. PATENT DOCUMENTS

| | | | |
|---|---|---|---|
| 1,693,074 | 11/1928 | Falco | 294/112 |
| 1,888,659 | 11/1932 | Eckhard | 271/269 |
| 2,007,886 | 7/1935 | Stussi | 271/268 |
| 2,966,086 | 12/1960 | Sjostrom . | |
| 3,221,901 | 12/1965 | Creamer | 414/18 |
| 3,233,750 | 2/1966 | Bannon | 414/753 |
| 3,533,619 | 10/1970 | Guenther et al. | 271/268 |
| 3,792,857 | 2/1974 | Bubley . | |
| 3,976,322 | 8/1976 | Johnson | 294/112 |
| 4,270,652 | 6/1981 | Lay et al. | 198/468.2 |
| 4,297,927 | 11/1981 | Kuroda . | |
| 4,460,083 | 7/1984 | Oyama | 198/468.2 |
| 4,463,641 | 8/1984 | Sato . | |
| 4,545,609 | 10/1985 | Pasquazzi et al. | 294/112 |

Primary Examiner—Joseph E. Valenza
Attorney, Agent, or Firm—Dressler, Goldsmith, Shore, Sutker & Milnamow, Ltd.

[57] ABSTRACT

An apparatus is provided for gripping and advancing a workpiece for processing. The apparatus includes a flexible tension member and guide pulleys for supporting the tension member. The tension member is entrained about the guide pulleys for movement on the guide pulleys in a workpiece advancing direction and in a direction opposite thereto. A gripping assembly is provided for gripping the workpiece, and the gripping assembly is operably connected to the tension member for operation between an open position and a closed position. A tensioning mechanism is provided for selectively tensioning and untensioning the tension member for operating the gripping assembly from between one of the open and closed positions and the other of the positions. A drive arrangement is provided for selectively moving the tension member on the guide pulleys to move the gripping assembly selectively in the advancing and opposite directions.

17 Claims, 8 Drawing Figures

WORKPIECE ADVANCING APPARATUS

TECHNICAL FIELD

This invention relates to apparatus for advancing a workpiece in a processing path.

BACKGROUND OF THE INVENTION AND TECHNICAL PROBLEMS POSED BY THE PRIOR ART

Many products manufactured today typically involve one or more processing operations effected on basic stock or workpieces. For example, with metal workpieces, such further processing can involve cutting, punching, drilling, and the like.

In an effort to provide lower cost manufacturing and higher quality with reduced manufacturing tolerances, it would be desirable to provide an apparatus for advancing a workpiece to a specific machine or machines for further processing. Additionally, when a relatively long workpiece is being processed, it would be desirable to provide means for accurately advancing the workpiece into the processing machine or machines by predetermined amounts or to predetermined positions.

Further, when processing relatively large workpieces, it would be beneficial if an advancing apparatus could be provided for securely gripping the workpiece with sufficient force to prevent the workpiece from being moved out of position during processing of the workpiece. Also, it would be advantageous if, after the first workpiece has been processed, the first workpiece could be released and then a new workpiece automatically engaged by the apparatus for subsequent advancement.

SUMMARY OF THE INVENTION

An apparatus is provided for gripping and advancing a workpiece for processing. The apparatus includes a flexible tension member and a guide means for supporting the tension member. The tension member is entrained about the guide means for movement on the guide means in a workpiece advancing direction and in a direction opposite thereto.

A gripping means is provided for gripping the workpiece, and the gripping means is operably connected to the tension member for operation between an open position and a closed position.

A tensioning means is provided for selectively tensioning and untensioning the tension member for operating the gripping means from between one of the open and closed positions and the other of the positions.

A drive means is provided for selectively moving the tension member on the guide means to move the gripping means selectively in the advancing and opposite directions.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 3 is a view similar to FIG. 2 but showing the gripping assembly closed and in a lowered position below the passline of a new workpiece;

DESCRIPTION OF THE PREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, used, and sold in an orientation other than the position described.

The apparatus of this invention has certain conventional components and control mechanisms the details of which, although not fully illustrated or described, will be apparent to those having skill in the art and an understanding of the necessary functions of such components and mechanisms.

Some of the Figures illustrating the preferred embodiment of the apparatus show conventional structural details and mechanical elements that will be recognized by one skilled in the art. However, the detailed descriptions of such elements are not necessary to an understanding of the invention, and accordingly, are not herein presented.

General Arrangement Of The Apparatus

Figure 1:
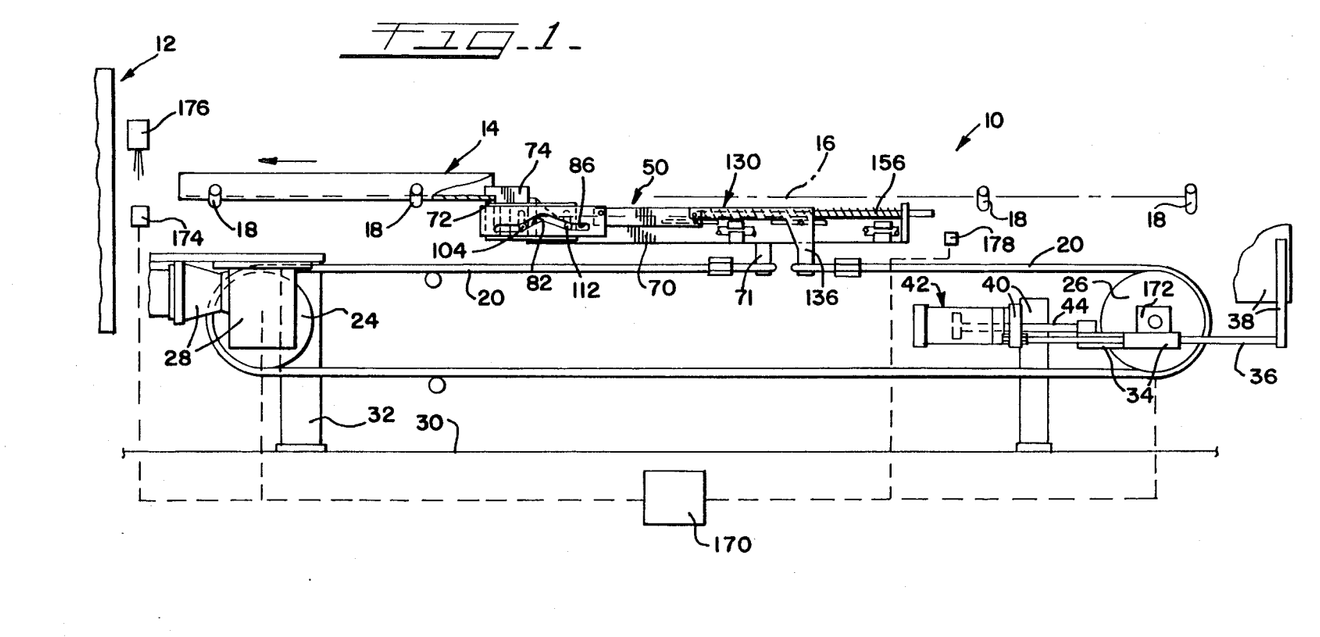
FIG. 1 is a fragmentary, simplified, side elevational view of the apparatus of the present invention shown gripping a workpiece.

Referring now to the drawings, the general arrangement and sequence of operation of the workpiece advancing apparatus can be best understood with reference to FIG. 1. The apparatus is designated generally by reference numeral 10 and is shown installed adjacent a workpiece processing machine 12. The machine 12 may be a shearing machine, punch press, cutting machine, drilling machine or the like. A number of such machines may be located generally along a processing line for operating on a workpiece seriatim or simultaneously.

A workpiece 14 is shown engaged by the apparatus 10 in FIG. 1. For purposes of illustration, the workpiece 14 is shown as a structural steel angle. The angle 14 is disposed in an upwardly open orientation with the angle vertex line lying in a horizontal plane and defining a passline 16 (FIG. 1) along which the lowest portion of the workpiece 14 moves. The workpiece 14 is disposed on rollers 18 which function as support means for supporting the workpiece 14 for movement in an advancing direction toward the processing machine 12 (toward the left as viewed in FIG. 1) and in an opposite direction (toward the right as viewed in FIG. 1).

The apparatus 10 includes a flexible tension member, such as a cable 20. The cable 20 is entrained about a guide means, such as a power-driven pulley 24 and an idler pulley 26.

As illustrated in FIG. 1, the driven pulley 24 is provided with a drive means, such as an electric motor or drive assembly 28 that includes a motor and an associated gear drive. The driven pulley 24, along with the motor or drive assembly 28, are suitably supported at a predetermined elevation above the floor 30 by an appropriate frame or support member 32.

The idler pulley 26 is mounted for rotation at a fixed height above the floor 30 to a sleeve assembly 34 which is slidably disposed on a rod 36 that is supported at one end by a frame 38 and at the other end by a floor-mounted support member 40.

A tensioning means, such as a pneumatically operated piston-cylinder actuator 42, is also mounted to the support member 40. The actuator 42 has a piston rod assembly 44 connected to the sleeve assembly 34. Pressurization of the cylinder of the actuator 42 causes the piston rod assembly 44 to displace the sleeve assembly 34, along with the idler pulley 26 carried thereon, away from the driven pulley 24 (to the right as viewed in FIG. 1).

Figure 6:
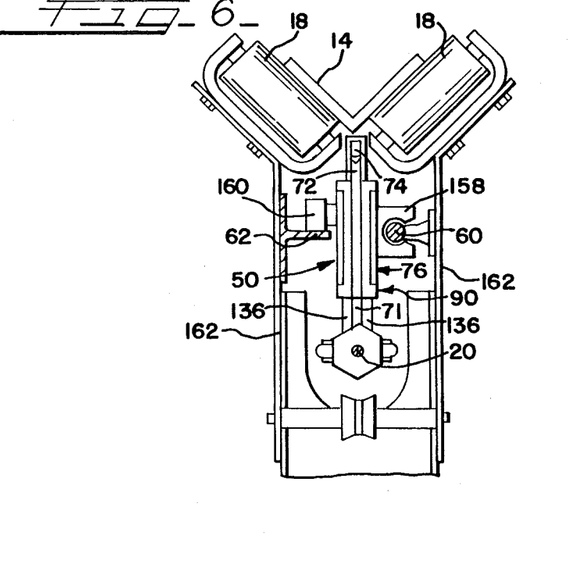
FIG. 6 is a greatly enlarged, fragmentary, cross-sectional view taken generally along the plane 6—6 in FIG. 3.

A gripping means or gripping assembly 50 is provided for gripping the workpiece 14 and is secured to both ends of the cable 20. A gripping assembly support means is provided for supporting the gripping assembly 50 for movement in the advancing direction (to the left as viewed in FIG. 1) and in the opposite direction, and the support means includes a fixed support rod 60 and a fixed support plate 62 (FIG. 6). Operation of the actuator 42, as described in more detail hereinafter, is effective to selectively apply tension to, and permit release of tension from, the cable 20 for operating the gripping means to grip or release the workpiece 14. Also, operation of the drive assembly 28, as described in more detail hereinafter, is effective to move the entire gripping assembly 50 selectively in the advancing direction and in the opposite direction.

The Gripping Assembly

Figure 4:
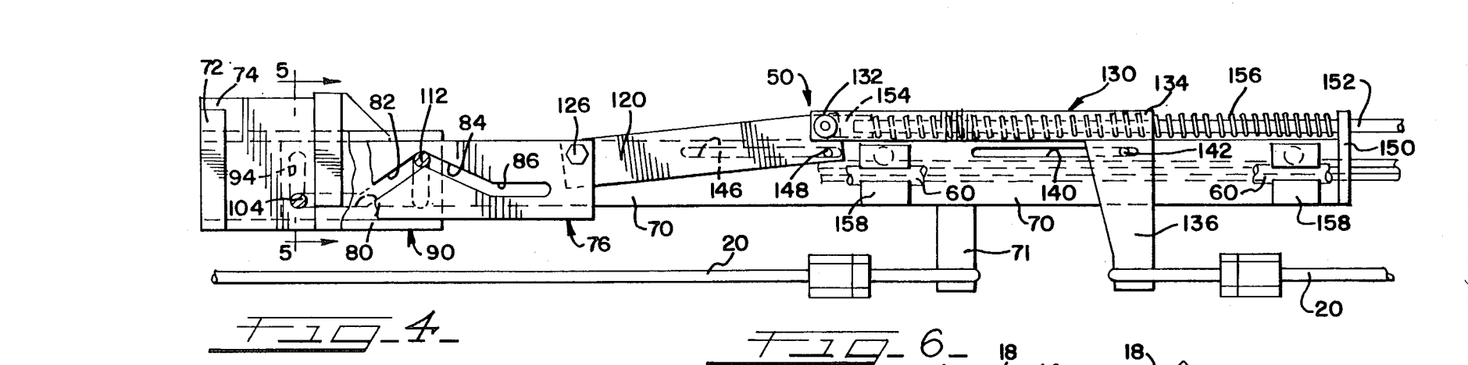
FIG. 4 is an even more greatly enlarged view similar to FIG. 3.
Figure 5:
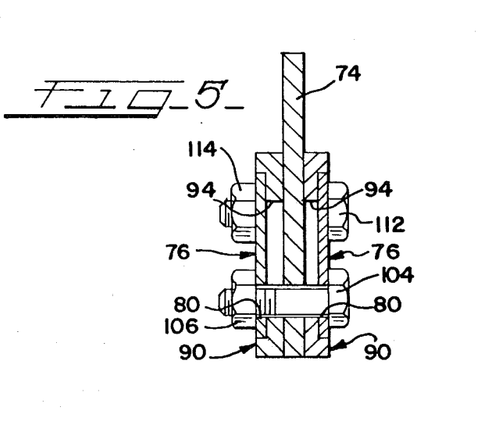
FIG. 5 is an even more greatly enlarged, cross-sectional view taken generally along the plane 5—5 in FIG. 4.

With reference now to FIGS. 4, 5 and 6, the gripping assembly 50 includes a carriage 70, and the carriage 70 includes a rigidly connected, downwardly depending member 71 which is secured to one end of the cable 20. A lower jaw 72 and an upper jaw 74 are provided at the front end (left-hand end) of the carriage 70. The jaws 72 and 74, although not mounted directly to the carriage 70, are nevertheless ultimately carried on the carriage 70 by means of intervening members which are next described in detail.

Figure 7:
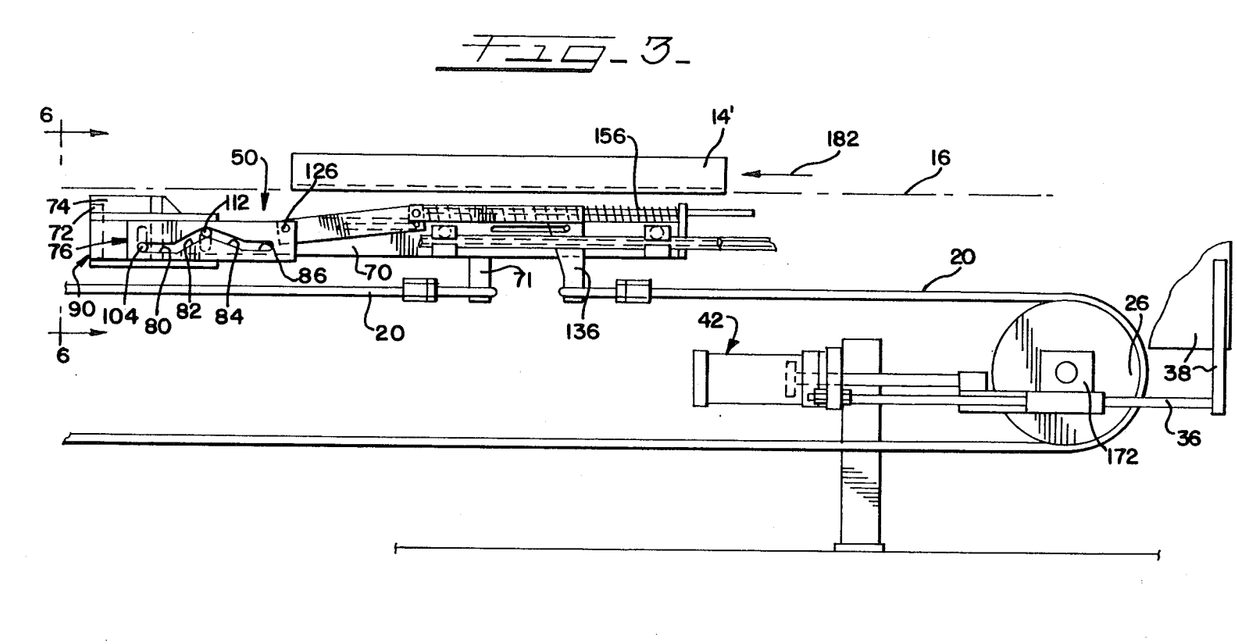
FIG. 7 is a fragmentary, perspective view of the front end of the gripping assembly with portions cut away to better illustrate underlying detail.
Figure 8:
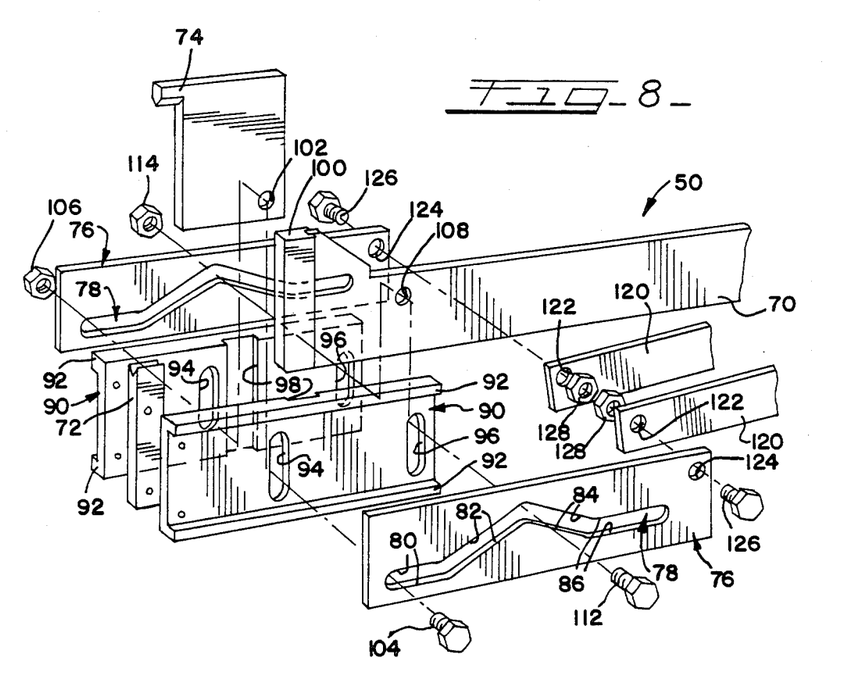
FIG. 8 is an exploded perspective view of the portion of the gripping assembly shown in FIG. 7.

With reference to FIGS. 7 and 8, the gripping assembly 50 further includes two spaced-apart cam track members 76 on either side of the carriage 70. Each cam track member 76 includes a cam track 78 which can be regarded as comprising four connected cam tracks: a horizontal front cam track 80, an inclined first cam track 82, and inclined second cam track 84, and a horizontal rear cam track 86.

Each cam track member 76 is disposed in a carrier plate 90, and each carrier plate 90 has upper and lower retaining flanges 92 for retaining the associated cam track member 76 in a fixed vertical relationship relative to the carrier plate 90.

Each carrier plate 90 defines a first vertical slot 94 and a second vertical slot 96. Further, each carrier plate 90 includes a vertical channel 98 for receiving a guide member 100 which is fixed to the distal end of the carriage 70. The engagement between the guide member 100 and the carrier plate channels 98 accommodates vertical movement of the carrier plates 90 relative to the carriage 70 by mechanisms described in detail hereinafter.

The lower jaw 72 is secured in fixed relationship between the two carrier plates 90. The upper jaw 74 is disposed adjacent the fixed lower jaw 72 and is adapted to slide vertically upwardly and downwardly relative to both the lower jaw 72 and the carrier plates 90.

The upper jaw 74 defines an aperture 102 which is in registry with the first vertical slots 94 of the carrier plates 90. A bolt 104 is mounted through the upper jaw aperture 102 and extends through the carier plate vertical slots 94 and also through the cam track 78 in each of the cam track members 76.

The bolt 104 is retained within the assembly by means of a nut 106. The bolt 104 functions as a cam follower within the cam track 78 for engaging the front cam track 80 and inclined first cam track 82. As explained in more detail hereinafter, this effects opening and closing of the upper jaw 74.

As best illustrated in FIG. 8, the carriage 70 defines an aperture 108 which is in registry with each second vertical slot 96 of each carrier plate 90. A bolt 112 is disposed within the aperture 108 and extends through the second vertical slot 96 in each carrier plate 90 and through the cam track 78 in each cam track member 76. The bolt 112 is retained in the assembly by means of a nut 114. The bolt 112 functions as a second cam follower for engaging the inclined second cam track 84 and the rear cam track 86. As explained in detail hereinafter, this accommodates longitudinal movement of the cam track members 76 with the consequent vertical displacement of the cam track members 76, carrier plates 90, and jaws 72 and 74 together relative to the carriage 70.

Disposed on either side of the carriage 70 are links 120. Each link 120 defines an aperture 122 which is in registry with apertures 124 defined in the adjacent cam track members 76. Each link 120 is pivotally connected to the adjacent cam track member 76 through the apertures 122 and 124 by means of a suitable pin or bolt 126 which may be secured with a thin nut 128.

As best illustrated in FIG. 4, each link 120 is pivotally connected at its rear end to an actuator link assembly 130 by means of a suitable connecting pin assembly 132. The actuator link assembly 130 is slidably carried on the carriage 70 and includes two spaced-apart parallel plates 134 with depending plates 136 to which one end of the cable 20 is attached.

Below the plates 134, but between the plates 136, the carriage 70 defines a horizontal slot 140. A pin 142 is mounted between the two spaced-apart plates 136 and is received within the carriage slot 140. The pin 142, in engagement with the slot 140, retains the actuator link assembly 130 in position on the carriage 70 and prevents the actuator link assembly 130 from falling out of the illustrated orientation on the carriage 70.

As best illustrated in FIG. 4, the carriage 70 also defines another horizontal slot 146 between the links 120. A pin 148 is disposed within the carriage slot 146 and is connected on each end to one of the links 120. The pin 148 has a diameter somewhat smaller than the height of the slot 146. The clearance between the pin 148 and slot 146 is sufficient to accommodate pivoting movement of the links 120 between a generally horizontal position (illustrated in FIGS. 1 and 2) and an angled position (illustrated in FIGS. 3 and 4). When the links 120 are in the horizontal position, the pin 148 functions to engage the upper horizontal surface of the carriage slot 146 to prevent the links 120 and actuator link assembly 130 from lifting upwardly away from the carriage 70.

As best illustrated in FIG. 4, the carriage 70 has at its rearward end a bracket 150 defining an aperture (not visible in the Figure) for slidably receiving therein a rod 152. The rod 152 extends along the top of the carriage 70 and is secured at its forward end to a socket 154 which is disposed between the actuator link assembly plates 134 and which is pivotally connected to the pin assembly 132.

Disposed around the rod 152 is a compression spring 156. The spring 156 acts at its rearward end against the carriage bracket 150 and at the forward end against the socket 154.

The Support Structure

The entire gripping assembly 50 is supported from the carriage 70 in a generally horizontal orientation at a selected height above the floor 30 by means of the previously described support rod 60 and support plate 62 (FIG. 6). To this end, as best illustrated in FIGS. 4 and 6, two brackets 158 are provided on one side of the carriage 70 for slidably engaging the support rod 60. On the other side of the carriage 70, two rollers 160 are mounted for engaging the support plate 62.

The support rod 60 and support plate 62 are mounted to suitable frame members 162 which project, at spaced-apart intervals, alongside the carriage 70 and to which are mounted the workpiece support rollers 18.

The Control System

In the preferred embodiment of the apparatus 10, the drive assembly 28 includes a direct current electric servomotor or an alternating current electric servomotor. As schematically illustrated in FIG. 1, the drive assembly 28 is provided with a suitable conventional controller 170. The controller 170 receives input from a suitable conventional rotational feedback device 172 associated with the idler pulley 26. The rotational feedback device may be an encoder or resolver, and it senses the rotation of the idler pulley 26 and transmits a signal, as a function of such rotation, to the controller 170.

The contoller 170 also receives input from a suitable conventional workpiece position sensing device, such as a photocell 174 mounted below the workpiece passline 16 in alignment with a conventional associated light source 176 that is mounted above the workpiece passline by an amount sufficient to permit passage of the workpiece 14.

A suitable position indicating device, such as an appropriate conventional limit switch 178, is provided at the rear end of the apparatus 10 at a predetermined point along the path of movement of the gripping assembly 50. The controller 170 receives input from the limit switch 178.

Typical Operating Cycle Of The Apparatus

Figure 2:
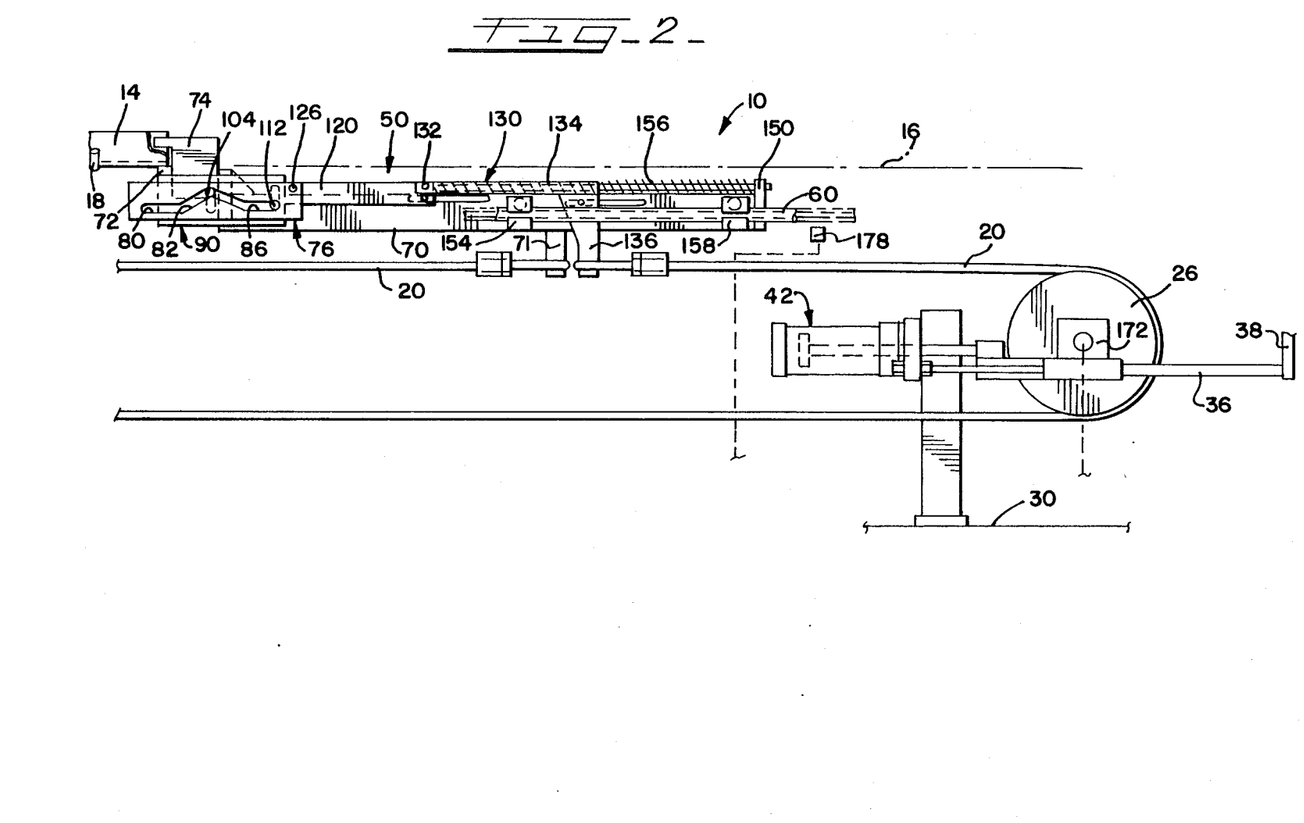
FIG. 2 is a view similar to FIG. 1 but in an enlarged scale and showing the right-hand portion of the apparatus with the gripping assembly disengaged from the workpiece in an opened position.

By way of illustrating the invention, one method of operating the apparatus 10 to effect the advancement of the workpiece 14 is next described in detail. It is assumed that the apparatus 10 is in an initial position as illustrated in FIG. 2 with the upper jaw 74 elevated to an open position relative to the lower jaw 72. The workpiece 14 has been conveyed, by suitable means (not illustrated) to an initial loading position on the workpiece support rollers 18. The rear end of the workpiece 14 is positioned in the open jaws.

In the initial position illustrated in FIG. 2, the pneumatically operated piston-cylinder actuator 42 is depressurized, and the idler pulley 26 is in the most retracted position relative to the actuator 42 and to the power-driven pulley 24. The cable 20 is thus substantially untensioned. The spring 156 on the carriage 70 tends to bias the carriage 70 relative to the pin assembly 132 and the connected actuator link assembly 130.

In the initial position illustrated in FIG. 2, the distance between the actuator link assembly 130 and the carriage front end (left-hand end in FIG. 2) is a minimum. Owing to the spring 156, a force is transmitted from the actuator link assembly 130 through the links 120 to the cam track members 76. An oppositely acting force is applied by the spring 156 to the carriage 70 and to the cam follower bolts 104 and 112 which are both restrained against longitudinal movement relative to the carriage 70 (FIG. 8).

As a result of action of the two oppositely directed forces generated by the spring 156, the relationship between the cam track members 76 and the bolt 112 is maintained as illustrated in FIG. 2 wherein the rear end of the rear cam track 86 engages the bolt 112. In this orientation, the carrier plates 90 are also necessarily maintained in an elevated position relative to the carriage 70 with the bottom end of each carrier plate second vertical slot 96 (FIG. 8) engaged with the bolt 112. The elevation of the carrier plates 90, and of the cam track members 76 carried therein, can be seen by comparing FIG. 2 with FIG. 4.

In the initial position illustrated in FIG. 2, the bolt 104 is at the top of the inclined first cam track 82 which has the effect of maintaining the upper jaw 74, which is mounted to the bolt 104, in the elevated position relative to the fixed lower jaw 72. It is to be noted that the elevated position of the upper jaw 74 and of the bolt 104 is accommodated in each of the carrier plates 90 by the first vertical slot 94 (FIG. 8).

Clamping of the workpiece 14 between the jaws 72 and 74 is initiated by pressurizing the pneumatically operated piston-cylinder actuator 42. This moves the idler pulley 26 away from the cylinder of the actuator 42 and away from the power-driven pulley 24. As the idler pulley 26 is moved to the extended position, the ends of the cable 20 secured to the carriage member 71 and actuator link assembly plates 136 tend to be pulled apart and effect compression of spring 156.

Also, as the idler pulley 26 moves to the extended position, the reaction of the cable 20 against the idler pulley 26 tends to apply a rotational torque to the idler pulley 26 (clockwise as viewed in FIG. 1). However, it is desired, at this step in the cycle, to prevent the idler pulley 26 from rotating and to maintain in a stationary position the end of the cable 20 attached to the carriage plates 136. To this end, the idler pulley rotation feedback device 172 senses the initiation of the rotation of the idler pulley 26. The controller 170, upon receiving the rotation sensing input from the feedback device 172, energizes the servomotor drive assembly 28 to rotate the power-driven pulley 24 in the counterclockwise direction as viewed in FIGS. 1 and 2. The amount of rotation of the power-driven pulley 24 is just sufficient to pull as much cable 20 as needed in the counterclockwise direction so as to prevent significant rotation of the idler pulley 26 as the idler pulley 26 moves away from the power-driven pulley 24 to its extended position.

Since the power-driven pulley 24 is being rotated to feed the bottom run of the cable 20 toward the outwardly moving idler pulley 26, the end of the cable 20 attached to the carriage at member 71 is necessarily pulled toward the power-driven pulley 24 while the cable end attached to the carriage plates 136 remains stationary. This results in the carriage 70 (with the jaws 72 and 74) being pulled relative to the other end of the cable 20 (attached to the plates 136) toward the workpiece 14 so that the throat of the upper jaw 74 abuts the rear end of the workpiece 14 and starts to push the workpiece 14 toward the workpiece processing machine 12 (toward the left as illustrated in FIG. 2 and toward the machine 12 illustrated in FIG. 1).

As the idler pulley 26 continues to be moved to the extended position, the end of the cable connected to the plates 136 remains stationary but the carriage 70 moves to the left as illustrated in FIG. 2. The tension force continues to be transmitted from the actuator link assembly 130 through the links 120 to the cam track members 76. This is opposite to the direction of the tension force applied to the carriage 70 through member 71 as the carriage 70 moves to the left.

As the carriage 70 moves to the left, the bolt 104 on which the upper jaw 74 is mounted, and which is necessarily maintained by the gripping assembly 50 in fixed longitudinal relationship on the carriage 70, moves with the upper jaw 74 in carriage 70 to the left relative to the cam track members 76. The bolt 104 thus necessarily functions as a cam follower engaged with the inclined first cam track 82 and causes the upper jaw 74 to move down toward the lower jaw 72 so as to grip the workpiece 14 as illustrated in FIG. 1.

As the carriage 70 moves to the left, the bolt 112 also is carried forward in the rear cam track 86 (to the left as viewed in FIGS. 1 and 2).

Once the workpiece 14 has been firmly clamped, the workpiece 14 necessarily prevents further movement of the upper jaw 74 downwardly relative to the lower jaw 72. The cam movement of the follower bolts 104 and 112 is thus terminated. FIG. 1 illustrates the positions of the bolts 104 and 112 in the cam tracks 82 and 86, respectively, in the clamping mode.

The actuator 42 continues to exert a displacement force on the idler pulley 26 to increase tension on the cable 20. The maximum cable tension is determined by the maximum pressurization force that the actuator 42 is capable of generating. This maximum tension force on the cable 20 is necessarily transferred through the components of the gripping assembly 50 in the manner described above, and this results in the application of a maximum gripping force.

A suitable sensor (not illustrated) may be provided in the pneumatic actuator 42 for determining the maximum pressurization at which point the next step in the operating cycle is initiated. Alternatively, the next step in the operating cycle may be initiated in response to a suitable predetermined time delay.

In any event, when the maximum pressurization of the actuator 42 has been achieved, the rotation sensor feedback device 172 can be operated in a different mode so as to permit rotation of the pulley 26 in response to the operation of the motor drive assembly 28. The controller 170 (FIG. 1) operates the motor drive assembly 28 to continuously rotate the power-driven pulley 24 in the counterclockwise direction as viewed in FIG. 1 so as to rotate the cable 20 in the counterclockwise direction and pull the entire carriage 70 to the left toward the workpiece processing machine 12. Because of the high tension in the cable 20, the friction force between the cable 20 and the pulleys 24 and 26 is very high. Thus, the power-driven pulley 24 causes movement of the cable on the pulleys with substantially no slippage.

As the workpiece 14 is advanced toward the workpiece processing machine 12, the leading edge of the workpiece 14 interrupts the circuit of the photocell 174 (FIG. 1). This is input to the controller 170 which initiates a length sensing mode of operation.

From the point of the interruption of the circuit of the photocell 174, the motor drive assembly 28 is operated for a predetermined number of revolutions or for a predetermined period of time by a suitable conventional control sub-system to advance a predetermined length of the workpiece 14 into the workpiece processing machine 12. The device 172 operates to accurately determine the cable movement. This can compensate for cumulative error. Upon advancing the predetermined length of the workpiece 14, the rotation of the motor drive assembly 28 is terminated by the controller 170. The workpiece processing machine 12 is then operated as desired to effect a particular processing of the workpiece 14 at that position (e.g., drilling, shearing, etc.). If desired, the controller 170 can initiate subsequent advancements of the workpiece 14 through predetermined distances for subsequent operations on the workpiece 14 by the workpiece processing machine 12 or by other, downstream, workpiece processing machines.

After the workpiece processing machine, or machines, have finished the processing of the workpiece 14, the pneumatic actuator 42 is depressurized by the operator to permit the idler pulley 26 to be returned or retracted from the extended position. Movement of the idler pulley 26 from the extended to the retracted position is effected by the spring 156 as the actuator 42 is depressurized. The spring 156 effects relative movement between the gripping assembly components so as to effect relative displacement between the carriage 71 and the plates 136 so that the distance between them is decreased. This reduces the distance between the ends of the cable 20.

As the idler pulley 26 moves to the retracted position, the reaction of the cable 20 against the idler pulley 26 tends to apply a rotational torque to the idler pulley 26 (counterclockwise as viewed in FIGS. 1 and 3). However, it is desired, at this step in the cycle, to prevent the idler pulley 26 from rotating. To this end, the idler pulley rotation feedback device 172 senses the initiation of the rotation of the idler pulley 26. The controller 170, upon receiving the rotation sensing input from the feedback device 172, energizes the servomotor drive assembly 28 to rotate the power-driven pulley 24 in the clockwise direction as viewed in the FIGS. 1 and 3. The amount of rotation of the power-driven pulley 24 is just sufficient to pull as much cable 20 as needed in the clockwise direction so as to prevent significant rotation of the idler pulley 26 as the idler pulley 26 moves toward the power-driven pulley 24 to the retracted position. Since the power-driven pulley 24 is being rotated to pull the bottom run of the cable 20 from the inwardly moving idler pulley 26, the end of the cable 20 attached to the carriage at member 71 is necessarily pulled away from the power-driven pulley 24. However, the spring 156 prevents movement of the plates 136 and the connected cable end. The plates 136 and connected cable end remain in the same position relative to both the carriage 70 and the power driven pulley 24. The spring 156 acts against the carriage rear bracket 150 to push the carriage 70 rearwardly a small amount (to the right as viewed in FIGS. 1 and 3).

As the idler pulley 26 is moved to the retracted position and as the carriage 70 moves to the right (opposite to the direction of arrow 182 in FIG. 3), the oppositely acting forces of the spring 156 are transmitted from the actuator link assembly 130 through the links 120 to the cam track members 76 on the one hand and to the cam follower bolts 104 and 112 on the other hand. Thus, as the carriage 70 moves to the right, the cam follower bolt 112 assumes the initial position at the rear end of the rear cam tracks 86.

As the carriage 70 moves to the right, the bolt 104 on which the upper jaw 74 is mounted, and which is necessarily maintained by the gripping assembly 50 in fixed longitudinal relationship on the carriage 70, also moves with the upper jaw 74 in carriage 70 to the right relative to the cam track members 76. The bolt 104 thus necessarily functions as a cam follower engaged with the inclined first cam track 82 and causes the upper jaw 74 to move up away from the lower jaw 72 to the open position. When the upper jaw 74 is in the maximum open position, the cam follower bolt 104 is at the top of the inclined first cam track (FIG. 2 illustrates the bolt 104 in such a position).

After the processed workpiece 14 is removed by a suitable means (not illustrated), the gripping assembly jaws are again closed, and the whole gripping assembly 50 is lowered below the passline 16 as illustrated in FIGS. 3 and 4. To this end, the actuator 42 is pressurized to again displace the idler pulley 26 outwardly away from the power-driven pulley 24 toward the extended position. As the idler pulley 26 is moved to the extended position, the ends of the cable 20 secured to the carriage member 71 and actuator link assembly plates 136 tend to be pulled apart and effect compression of spring 156.

Also, as the idler pulley 26 moves to the extended position, the reaction of the cable 20 against the idler pulley 26 tends to apply a rotational torque to the idler pulley 26 (clockwise as viewed in FIG. 1). However, it is desired, at this step in the cycle, to prevent the idler pulley 26 from rotating and to maintain in a stationary position the end of the cable 20 attached to the carriage plates 136. To this end, the idler pulley rotation feedback device 172 senses the initiation of the rotation of the idler pulley 26. The controller 170, upon receiving the rotation sensing input from the feedback device 172, energizes the servomotor drive assembly 28 to rotate the power-driven pulley 24 in the counterclockwise direction as viewed in FIGS. 1 and 3. The amount of rotation of the power-driven pulley 24 is just sufficient to pull as much cable 20 as needed in the counterclockwise direction so as to prevent significant rotation of the idler pulley 26 as the idler pulley 26 moves away from the power-driven pulley 24 to its extended position. Since the power-driven pulley 24 is being rotated to feed the bottom run of the cable 20 toward the outwardly moving idler pulley 26, the end of the cable 20 attached to the carriage at member 71 is necessarily pulled toward the power-driven pulley 24 while the cable end attached to the carriage plates 136 remains stationary. This results in the carriage 70 (with the jaws 72 and 74) being pulled forward some amount (relative to the other end of the cable 20 attached to the plates 136). The empty jaws 72 and 74 are thus carried a small distance further toward the workpiece processing machine 12 (toward the left as illustrated in FIG. 3).

As the idler pulley 26 continues to be moved to the extended position and as the carriage 70 moves to the left as illustrated in FIG. 2, the tension force continues to be transmitted from the actuator link assembly 130 through the links 120 to the cam track members 76. This is opposite to the direction of the tension force applied to the carriage 70 through member 71 as the carriage 70 moves to the left. As the carriage 70 moves to the left, the bolt 104 on which the upper jaw 74 is mounted, and which is necessarily maintained by the gripping assembly 50 in fixed longitudinal relationship on the carriage 70, moves with the upper jaw 74 in carriage 70 to the left relative to the cam track members 76. The bolt 104 thus necessarily again functions as a cam follower engaged with the inclined first cam track 82 and causes the upper jaw 74 to move down toward the lower jaw 72. However, since the workpiece 14 has now been removed from between the jaws, the upper jaw 74 continues to be lowered all the way until it abuts the lower jaw 72. As this occurs, relative movement of the gripping assembly components results in the inclined first cam track 82 of each cam track member forcing the upper jaw cam follower bolt 104 downwardly. Continued relative longitudinal movement between the carriage 70 and the actuator link assembly 130 results in the upper jaw cam follower bolt 104 being positioned at the front end of the front cam track 80.

Also, as the upper jaw 74 is closing, relative movement is effected between the cam follower bolt 112 and the cam track members 76 (i.e., in rear cam tracks 86 and inclined second cam tracks 84). The cam follower bolt 112 is carried forward out of the cam tracks 86 and ultimately becomes positioned at the top of the inclined second cam track 84 of each cam track member 76. Since the cam follower bolt 112 is fixed in the end of the carriage 70, engagement of the cam follower bolt 112 with the inclined second cam track 84 necessarily results in the cam track members 76 being lowered relative to the cam follower bolt 112 and to the carriage 70.

When the maximum pressurization is reached in the actuator 42, the spring 156 has been compressed and the maximum longitudinal displacement has occurred between the cam track members 76 and the carriage 70. This maximum longitudinal displacement corresponds to the lowest position of the cam track members 76, carrier plates 90, and jaws 72 and 74 relative to the carriage 70 as illustrated in FIG. 3. In this lowest position, the upper jaw 74 lies below the workpiece passline 16. Accordingly, a second workpiece 14' can be conveyed by suitable means forwardly (in the direction of arrow 182 illustrated in FIG. 3). The new workpiece 14' is conveyed to the initial loading position (by appropriate means not illustrated), and the entire gripping assembly 50 can be simultaneously returned beneath the new workpiece 14'.

Return of the lower gripping assembly 50 beneath the new workpiece 14' to the initial position is effected after the actuator 42 has reached its maximum pressurization. The controller 170 is programmed to disregard the input of the rotation sensor 172 during this gripping assembly return step. At this point, the motor is energized to effect rotation of the power-driven pulley 24 in the appropriate direction of rotation (clockwise as viewed in FIG. 1). This causes the tensioned cable 20 to rotate with the pulley 24 so as to pull the entire carriage 70 back to the initial longitudinal position (behind the new workpiece 14', but still below the passline 16). This is sensed by the limit switch 178 which is actuated when the carriage 70 reaches this position and which, through input to the controller 170 (FIG. 1), deenergizes the drive assembly motor.

In response to the same input from the actuated limit switch 178, the program for the controller 170 at this point permits the controller 170 to again respond to the rotation sensor input 172. Also, in response to the actuation of limit switch 178, the actuator 42 is depressurized to release the displacement force on the idler pulley 26. This permits the spring 156 to effect relative displacement between the gripping assembly components so as to effect relative displacement between the carriage member 71 and plates 136 so that the distance between them is decreased. This reduces the distance between the ends of the cable 20.

As the idler pulley 26 moves to the retracted position, the reaction of the cable 20 against the idler pulley 26 tends to apply a rotational torque to the idler pulley 26 (counterclockwise as viewed in FIGS. 1 and 3). However, it is desired, at this step in the cycle, to prevent the idler pulley 26 from rotating. To this end, the idler pulley rotation feedback device 172 senses the initiation of the rotation of the idler pulley 26. The controller 170, upon receiving the rotation sensing input from the feedback device 172, energizes the servomotor drive assembly 28 to rotate the power-driven pulley 24 in the clockwise direction as viewed in FIGS. 1 and 3. The amount of rotation of the power-driven pulley 24 is just sufficient to pull as much cable 20 as needed in the clockwise direction so as to prevent significant rotation of the idler pulley 26 as it moves toward the power-driven pulley 24 to the retracted position. Since the power-driven pulley 24 is being rotated to pull the bottom run of the cable 20 from the inwardly moving idler pulley 26, the end of the cable 20 attached to the carriage at member 71 is necessarily pulled away from the power-driven pulley 24. However, the spring 156 prevents movement of the plates 136 and the connected cable end. The plates 136 and connected cable end remain stationary and at the same distance from the power-driven pulley 24. The spring 156 acts against the carriage rear bracket 150 to push the carriage 70 rearwardly a small amount (to the right as viewed in FIGS. 1 and 3).

As the idler pulley 26 is moved to the retracted position and as the carriage 70 moves to the right (opposite to the direction of arrow 182 in FIG. 3), the oppositely acting forces of the spring 156 are transmitted from the actuator link assembly 130 through the links 120 to the cam track members 76 on the one hand and to the cam follower bolts 104 and 112 on the other hand.

As the carriage 70 moves to the right, the bolt 104 on which the upper jaw 74 is mounted, and which is necessarily maintained by the gripping assembly 50 in fixed longitudinal relationship on the carriage 70, moves with the upper jaw 74 in carriage 70 to the right relative to the cam track members 76. The bolt 104 thus necessarily functions as a cam follower engaged with the inclined first cam track 82 and causes the upper jaw 74 to move up away from the lower jaw 72 to the open position. When the upper jaw 74 is in the maximum open position, the cam follower bolt 104 is at the top of the inclined first cam track (FIG. 2 illustrates the bolt 104 in such a position).

As the carriage 70 moves to the right, the cam follower bolt 112 also assumes a new position. Specifically, the position of the bolt 112 at the top of the inclined second cam track 84 (FIG. 4) changes so that the bolt 112 is at the rear end of the rear cam track 86. This action causes the cam track members 76 to be elevated relative to the carriage 70, thereby raising the entire assembly of the gripping jaws 72 and 74 toward the passline 16.

As the jaws 72 and 74 are raised from the lower position below the passline 16 to the upper position at the passline 16, and as the upper jaw 74 is opened relative to the lower jaw 72, the idler pulley 26 is still moving to the retracted position under the influence of the spring 156 while the carriage 70 is moving rearwardly (to the right as viewed in FIG. 2). Thus, as the jaws 72 and 74 are elevated to the passline 16, and as the upper jaw 74 is opened relative to the lower jaw 72, the carriage 70 is further retracted behind the new workpiece 14' while the cam track members 76 assume an extended position beyond the front of the carriage 70.

When the jaws 72 and 74 have been raised to the passline 16 and opened behind the rear end of the new workpiece 14', the gripping assembly 50 can then be moved forward to engage the rear end of the new workpiece 14'. To this end, the program of the controller 170 disregards the input from the rotation sensor 172 when a limit switch or other suitable sensor (not illustrated) signals the controller 170 (FIG. 1) that the jaws are opened and are ready to be moved forward. The controller 170 then energizes the motor drive assembly 28 to rotate the power-driven pulley 24 in the counterclockwise direction (as viewed in FIG. 1). This pulls the cable 20 in the counterclockwise direction of rotation around the pulleys and moves the carriage 70 to bring the open jaws into position against the rear end of the new workpiece 14'. Although the cable 20 is not under high tension from actuator 42 as this occurs, the spring 156 exerts a sufficient low tension force on the cable 20 so that the cable 20 is properly driven by the pulley 24.

The motor drive assembly 28 is deenergized in response to visual observation by the operator or in response to the jaws engaging a limit switch or other suitable sensor (not illustrated) at the rear end position of the workpiece 14'. At this point, the program of the controller 170 again permits the controller to respond to subsequent input from the rotation sensor 172.

Modifications

It is to be realized that the foregoing description of the operating sequence assumes that the apparatus operation cycle was initiated with the apparatus 10 positioned as illustrated in FIG. 2. It is to be realized that the apparatus 10 may be operated with the initial operation starting and terminating at some other point in the cycle.

It will be appreciated that the flexible tension member or cable 20 need not necessarily be mounted on two spaced-apart pulleys as illustrated. A flexible tension member may be entrained around any suitable one-piece or multi-piece guide system. Further, means for applying tension to the flexible tension member may take a form other than the illustrated pneumatic actuator and pulley assembly. For example, a small movable guide could be provided with means for moving the guide against the flexible tension member to apply tension.

While the apparatus has been described in connection with gripping and advancing a workpiece having the shape of a structural angle member, it is to be realized that the apparatus may be adapted to accommodate workpieces having a variety of shapes. Such accommodation would typically be effected by making appropriate modifications to the shape of the gripping jaws and to the orientation of the support rollers 18.

It will also be seen that the apparatus of the present invention can be automatically operated with appropriate conventional controllers which can compensate for accumulative error resulting from the assembled components, such as variations in the circumferences of the pulleys. Such a conventional control system may be conveniently pre-programmed for proper positioning of the workpiece, including workpieces which may have a length of 10 meters or more.

It is apparent that the described preferred embodiment of the apparatus 10 accommodates the efficient processing of workpieces by lowering the gripping jaws below the workpiece passline so that the gripping jaws can be returned to a loading position below the workpiece passline at the same time a new workpiece is conveyed above. However, it will be appreciated that, where such efficiency is not needed, simplification of the apparatus design can be achieved by eliminating certain structural features which serve only to raise and lower the jaws together relative to the workpiece passline.

Attention is drawn to the fact that in the preferred embodiment of the apparatus 10 illustrated, the spring 156 is a compression spring functioning to open the gripping jaws when the flexible tension member cable 20 is untensioned. It will be appreciated that the apparatus 10 could be modified to effect the opening of the gripping jaws by tensioning the cable and to effect closing of the jaws by means of a spring.

It will be readily observed from the foregoing detailed description of the invention and from the illustrated emdodiment thereof that numerous other variations and modifications may be effected without departing from the true spirit and scope of the novel concepts or principles of the invention.

What is claimed is:

1. Apparatus for gripping and advancing a workpiece for processing, said apparatus including:
    (a) a flexible tension member;
    (b) guide means for supporting said tension member, said tension member being trained about said guide means for movement on said guide means in a workpiece advancing direction and in a direction opposite thereto;
    (c) gripping means including a pair of cooperating jaw means for gripping said workpiece, said jaw means of said gripping means being operatively connected to said tension member for operation of said jaw means between an open position wherein said jaw means are spaced apart, and a closed position by relative movement of said jaw means toward each other, said flexible tension member including two ends, with one of said ends operatively connected with one of said jaw means, and with the other of said ends operatively connected with the other of said jaw means;
    (d) tensioning means for selectively tensioning and untensioning said tension member for operating said jaw menas of said gripping means from between one of said open and closed positions and the other of said positions; and
    (e) drive means for selectively moving said tension member on said guide means to move said pair of cooperating jaw means of said gripping means selectively in said advancing and opposite directions.

2. The apparatus in accordance with claim 1 in which said tension member includes a cable; and
    said guide means includes two spaced-apart pulleys.

3. The apparatus in accordance with claim 2 in which one of said pulleys is movable relative to the other of said pulleys; and
    said tensioning means includes means for moving said one pulley relative to the other.

4. The apparatus in accordance with claim 3 in which said means for moving said one pulley includes a pneumatically operated piston-cylinder actuator.

5. The apparatus in accordance with claim 1 in which said drive means includes a motor operatively connected to a pulley of said guide means, said pulley being frictionally engaged with said flexible tension member.

6. The apparatus in accordance with claim 1 in which said tensioning means includes means for selectively tensioning said tension member for operating said gripping assembly from said open position toward said closed position whereby said workpiece can be gripped and for selectively releasing tension on said tension member to permit opening of said gripping assembly.

7. Apparatus for gripping and advancing a workpiece for processing, said apparatus including:
    (a) a flexible tension member;
    (b) guide means for supporting said tension member, said tension member being entrained about said guide means for movement on said guide means in a workpiece advancing direction and in a direction opposite thereto;
    (c) gripping means for gripping said workpiece, said gripping means being operatively connected to said tension member for operation between an open position and a closed position;
    (d) tensioning means for selectively tensioning and untensioning said tension member for operating said gripping means from between one of said open and closed positions and the other of said positions; and
    (e) drive means for selectively moving said tension member on said guide means to move said gripping means selectively in said advancing and opposite directions,
    (f) said gripping means including a carriage and an upper jaw and lower jaw carried on said carriage, said upper jaw being movable toward and away from said lower jaw;
    (g) said gripping means also including a cam track member defining an inclined first cam track movable relative to said carriage;
    (h) said gripping means including a first cam follower fixed to said upper jaw for engaging said first cam track; and
    (i) said flexible tension member including two ends, one of said flexible tension member ends being fixed to said carriage and the other of said flexible tension member ends being operatively connected to said cam track member for moving said cam track member longitudinally relative to said carriage and said jaws whereby, when said tension member is tensioned, said upper jaw is displaced downwardly from an open position so as to lower said upper jaw toward closed position.

8. The apparatus in accordance with claim 7 in which said apparatus further includes a biasing means on said carriage effective when said tension member is untensioned for biasing said cam track member longitudinally along, and relative to, said carriage to an extended position wherein said first cam follower is positioned by said inclined first cam track to maintain said upper jaw in said opened position.

9. The apparatus in accordance with claim 8 in which
a carrier plate is mounted on said carriage for vertical movement relative to said carriage, said carrier plate having retaining means for retaining said cam track member in a fixed vertical relationship relative to said carrier plate, said lower jaw being fixed to said carrier plate, said carrier plate defining first and second vertical slots, said first cam follower extending through said first slot and into said cam track member inclined first cam track;

said cam track member defines an inclined second cam track; and said apparatus further includes a second cam follower that is fixed to said carriage and extends through said second slot in said carrier plate for engaging said inclined second cam track whereby longitudinal movement of said cam track member can effect engagement of said cam track member with said second cam follower in said inclined second cam track to vertically displace said cam track member, carrier plate, and jaws together relative to said carriage.

10. Apparatus for gripping and advancing a workpiece for processing, said apparatus including:
  (a) a cable;
  (b) at least two spaced-apart guide pulleys for supporting said cable, said cable being trained about said guide pulleys for movement on said guide pulleys in a workpiece advancing direction and in a direction opposite thereto, one of said pulleys being mounted for movement toward and away from the other pulley;
  (c) a gripping asembly including cooperating upper and lower jaws for gripping said workpiece, said gripping assembly being operatively connected to said cable for operation of said jaws between an open position wherein said upper jaw is spaced above said lower jaw, and a closed position by relative movement of said jaws toward each other;
  (d) a gripping assembly support means for supporting said gripping assembly for movement in said advancing and opposite directions;
  (e) tensioning means for selectively moving said one pulley toward and away from said other pulley to selectively tension said cable for operating said jaws of said gripping assembly from said open position toward said closed position whereby said workpiece can be gripped by said jaws, and to selectively untension said cable to permit opening of said jaws of said gripping assembly;
  (f) drive means for selectively rotating said other pulley to move said cable and said connected gripping assembly in said advancing and opposite directions; and first sensor means for sensing the position of said workpiece, second sensor means for sensing the rotation of said one pulley, and control means for actuating said drive means.

11. The apparatus in accordance with claim 10 further including a biasing means effective when said cable is untensioned for biasing said gripping assembly to said opened position.

12. Apparatus for gripping and advancing a workpiece for processing, said apparatus including:
  (a) a cable;
  (b) at least two spaced-apart guide pulleys for supporting said cable, said cable being trained about said guide pulleys for movement on said guide pulleys in a workpiece advancing direction and in a direction opposite thereto, one of said pulleys being mounted for movement toward and away from the other pulley;
  (c) a gripping assembly including cooperating upper and lower jaws for gripping said workpiece, said gripping assembly being operatively connected to said cable for operation of said jaws between an open position wherein said upper jaw is spaced above said lower jaw, and a closed position by relative movement of said jaws toward each other;
  (d) a gripping assembly support means for supporting said gripping assembly for movement in said advancing and opposite directions;
  (e) tensioning means for selectively moving said one pulley toward and away from said other pulley to selectively tension said cable for operating said jaws of said gripping assembly from said open position toward said closed position whereby said workpiece can be gripped by said jaws, and to selectively untension said cable to permit opening of said jaws of said gripping assembly; and
  (f) drive means for selectively rotating said other pulley to move said cable and said connected gripping assembly in said advancing and opposite directions;

wherein said gripping assembly comprises a carriage mounted for movement along said gripping assembly support means, with said lower jaw being carried by said carriage, and a cam track member defining an inclined first cam track and being carried on said carriage for movement relative to said carriage;

said gripping assembly further comprising a first cam follower for engaging said inclined first cam track, said upper jaw being fixed to and carried by said first cam follower for vertical movement relative to said lower jaw between said closed position wherein said upper jaw is lowered, and said opened position wherein said upper jaw is raised, and biasing means on said carriage for biasing said cam track member longitudinally along, and relative to, said carriage to an extended position wherein said first cam follower is positioned at a portion of said inclined first cam track to maintain said upper jaw in said raised, opened position.

13. The apparatus in accordance with claim 12 in which
a carrier plate is mounted on said carriage for vertical movement relative to said carriage, said carrier plate having retaining means for retaining said cam track member in a fixed vertical relationship relative to said carrier plate, said lower jaw being fixed to said carrier plate, said carrier plate defining first and second vertical slots, said first cam follower extending through said first slot for engaging said cam track member inclined first cam track;

said cam track member defines an inclined second cam track;

said apparatus further includes a workpiece support means for supporting said workpiece for movement in said advancing and opposite directions at an elevation above said carriage to define a passline along which the lowest portion of said workpiece moves; and said apparatus further includes a second cam follower that is fixed to said carriage and extends through said second slot in said carrier plate for engaging said inclined second cam track whereby longitudinal movement of said cam track member can effect engagement of said cam track member with said second cam follower in said inclined second cam track to vertically displace said cam track member, carrier plate, and jaws together relative to said carriage and passline.

14. The apparatus in accordance with claim 10, wherein
said cable includes two ends, with one of said ends operatively connected with said upper jaw, and with the other of said ends operatively connected with said lower jaw.

15. Apparatus for gripping and advancing a workpiece for processing, said apparatus including:
(a) a flexible tension member including two ends;
(b) guide means for supporting said tension member, said tension member being entrained about said guide means for movement on said guide means in a workpiece advancing direction and in a direction opposite thereto;
(c) gripping means for gripping said workpiece, said gripping means including a carriage to which one end of said flexible tension member is fixed, and further including an upper jaw and a lower jaw carried by said carriage, with said upper jaw being movable toward and away from said lower jaw, the other end of said flexible tension member being operatively connected to said upper jaw, whereby said gripping means is operatively connected to said tension member for operation of said jaws between an open position wherein said upper jaw is spaced from said lower jaw and a closed position by movement of said upper jaw toward said lower jaw;
(d) tensioning means for selectively tensioning and untensioning said tension member for operating said jaws of said gripping means between said open and closed positions, said upper jaw being displaced downwardly from said open position toward said closed position by tensioning of said tension member by said tensioning means; and
(e) drive means for selectively moving said tension member on said guide means to move said gripping means selectively in said advancing and opposite directions.

16. The apparatus in accordance with claim 15, wherein
said guide means includes a pair of spaced-apart pulleys about which said tension member is entrained, and means mounting one of said pulleys for movement relative to the other of said pulleys,
said tensioning means comprising means for moving said one pulley relative to the other one of said pulleys for thereby tensioning and untensioning said tension member.

17. Apparatus for gripping and advancing a workpiece for processing, said apparatus comprising:
($a_1$) workpiece support means defining a passline along which said workpiece is advanced;
($a_2$) a flexible tension member;
(b) guide means including a pair of spaced apart pulley means for supporting said tension member in operative association with said workpiece support means, said tension member being trained about said guide means for movement on said guide means in a workpiece advancing direction and in a direction opposite thereto;
(c) gripping means positioned generally intermediate of said spaced apart pulley means for movement therebetween, said gripping means including a pair of cooperating jaw means positionable relative to said workpiece support means for gripping said workpiece for advancement of the workpiece along the passline defined by said workpiece support means, said jaw means of said gripping means being operatively connected to said tension member for operation of said jaw means between an open position wherein said jaw means are spaced apart, and a closed position by relative movement of said jaw means toward each other;
(d) tensioning means for selectively tensioning and untensioning said tension member for operating said jaw means of said gripping means from between one of said open and closed positions and the other of said positions; and
(e) drive means for selectively moving said tension member on said guide means to move said pair of cooperating jaw means of said gripping means relative to said workpiece support means selectively in said advancing and opposite directions.

* * * * *